(12) United States Patent
Carneal et al.

(10) Patent No.: US 6,282,542 B1
(45) Date of Patent: Aug. 28, 2001

(54) DISTRIBUTED SYSTEM AND METHOD FOR PREFETCHING OBJECTS

(75) Inventors: Bruce L. Carneal, Del Mar; Jeremy Guralnick, Encinitas; Ram A. Fish, San Diego, all of CA (US)

(73) Assignee: Tachyon, Inc., San Diego, CA (US)

( * ) Notice: Subject to any disclaimer, the term of this patent is extended or adjusted under 35 U.S.C. 154(b) by 0 days.

(21) Appl. No.: 09/129,142

(22) Filed: Aug. 5, 1998

Related U.S. Application Data

(60) Provisional application No. 60/054,847, filed on Aug. 6, 1997.

(51) Int. Cl.[7] .................................................. G06F 17/30
(52) U.S. Cl. ............................ 707/10; 709/219; 713/201
(58) Field of Search ............ 707/10, 104; 709/218–219, 709/229; 705/52, 501; 713/201, 113, 118

(56) References Cited

U.S. PATENT DOCUMENTS

| | | | |
|---|---|---|---|
| 5,673,322 | * | 9/1997 | Pepe et al. .............................. 705/52 |
| 5,706,507 | * | 1/1998 | Schloss ................................. 707/104 |
| 5,715,445 | * | 3/1998 | Wolfe ...................................... 707/5 |
| 6,003,087 | * | 12/1999 | Housel, III et al. .................. 709/229 |

OTHER PUBLICATIONS

Zheng Wang, and Jon Crowcroft, Prefetching in WWW, Communications, Department of Computer Science, Nov. 18, 1996.*

Zheng Wang, and Jon Crowcroft, Department of Computer Science, *Prefetching in World Wide Web*, Communications: The Key to Global Prosperity. Globecom 1996 Internet 96 Conference Record, London, dated Nov. 18, 1996, pp. 28–32. (See attached International Search Report).

H. Shrikumar and Rehmi Post, Physics and Computer Science, *Thinternet: Life at the End of a Tether, Computer Networks and ISDN Systems*, vol. 27, No. 3. (Dec. 1994). pp. 375–385. (See attached International Search Report).

Charles Brooks, Murray S. Mazer, Scott Meeks, and Jim Miller, Application–Specific Proxy Server as HTTP Stream Transducers, WWW4 Conferences, (Dec. 1995) pp. 1–9, (See attached International Search Report).

Ari Luotonen (1998) Web proxy servers. Netscape Communications Corporation. Cover pp. 170 through 171.

WWW Collector—The prefetching proxy server for WWW. (1998) k–chinen@is.aist–nara.ac.jp.NAIST.

* cited by examiner

*Primary Examiner*—Hosain T. Alam
*Assistant Examiner*—Jean Bolte Fleurantin
(74) *Attorney, Agent, or Firm*—Knobbe, Martens, Olson & Bear, LLP

(57) ABSTRACT

In an internet access system which includes a satellite link, a distributed proxy server (68) is provided which reduces a delay associated with the retrieval of inline objects of web pages. The distributed proxy server (68) includes an access point component (70) and a satellite gateway component (72). The access point component (70) runs on the client (browser) side of the satellite link and communicates with web browsers (20A–20N). The satellite gateway component (72) runs on the internet side of the satellite link and communicates with web servers (26). As a web page is retrieved over the satellite link, the satellite gateway component (72) parses the base file component of the web page to identify any references to inline objects of the web page, and prefetches each such inline object. The distributed proxy server thereby eliminates the delays normally associated with (a) waiting for the web browser (20) to receive the base component and request the object(s), and (b) waiting for the browser's object request(s) to be transmitted over the satellite link. The prefetched objects are transmitted over the satellite link to the access point component (70), which in-turn stores the prefetched objects in an object cache (71). When a web browser (20) requests an inline object, the access point component (70) checks the cache (71), and if the object resides therein, returns the object to the browser (20) without forwarding the object request over the satellite link. Traffic over the forward satellite link is thus reduced. The method implemented by the distributed proxy server (68) can also be used to reduce delays and traffic over other types of links, including non-wireless links.

50 Claims, 5 Drawing Sheets

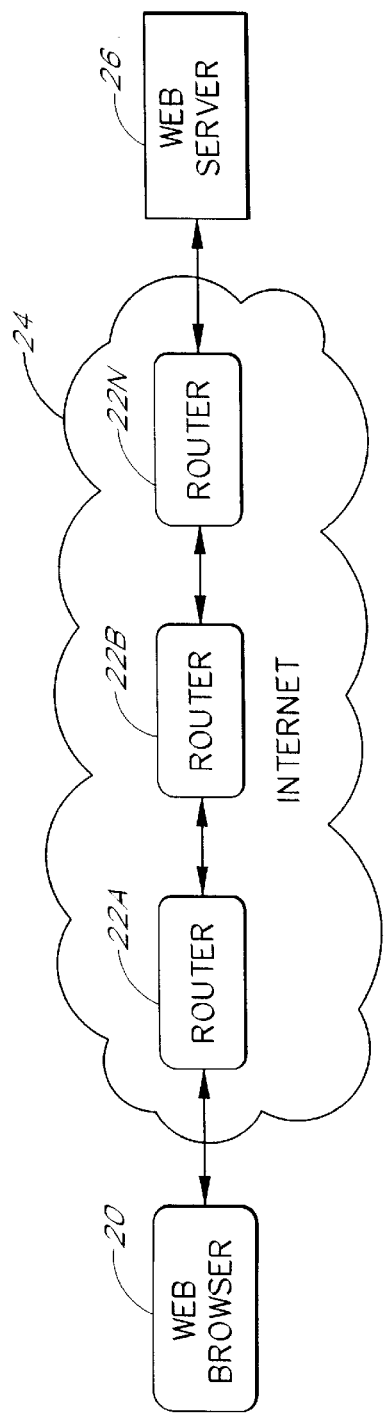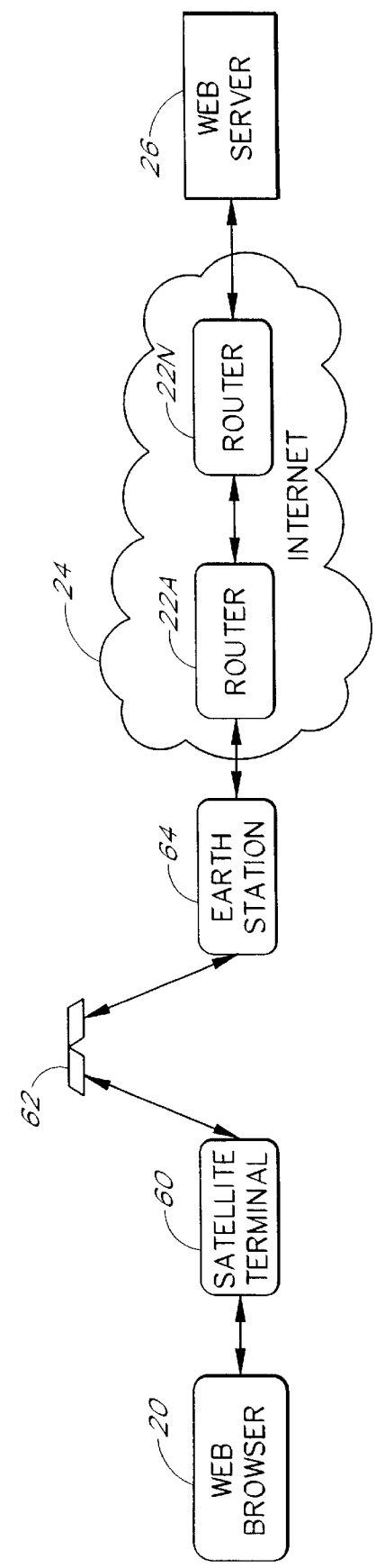
FIG. 1
FIG. 3

DISTRIBUTED SYSTEM AND METHOD FOR PREFETCHING OBJECTS

RELATED APPLICATION

This application claims priority under 35 U.S.C. Section 119(e) to U.S. provisional patent application entitled, "Network Architecture and Method For Improved Data Communications Over a Channel That Includes a Satellite Link," Ser. No. 60/054,847, and filed Aug. 6, 1997, the disclosure of which is hereby incorporated by reference.

BACKGROUND OF THE INVENTION

I. Field of the Invention

This invention relates generally to data transfer. More specifically, the invention relates to digital data transfer over a digital network.

II. Description of the Related Art

The bloom of the Internet has encouraged many companies and individuals to establish an Internet presence. For example, a company may create a web page which describes its products and services and allows a user to place a purchase order. These web pages are stored on web servers. A user may access a web page from the a web server using web browser software running on a computer. The web page may contain links to other information at the same site or other web sites.

FIG. 1 is a block diagram showing an Internet connection. A user originates a file request from a web browser 20. The web browser 20 may comprise a personal computer, a network terminal or any other manner of digital user terminal capable of executing web browsing software. The request is passed through a series of routers 22A–22N of the Internet 24. The routers 22A–22N do not examine the contents of the request but simply transfer the request to an appropriate web server 26 according to an address header. The web server 26 examines the contents of the request and responds with the requested file.

When a user would like to access information on the Internet, the user enters a uniform resource locator (URL) into the web browser. The URL is basically a pointer to the location of an object. For example, "http:\\www.internic.net\rfc\rfc1738.txt" is the URL address which points to a Request For Comment document which describes uniform resource locators. In the URL, the "http" indicates that the HyperText Transfer Protocol (HTTP) protocol is used to access the site. A double backslash indicates that a host name follows such as "www.internic.net". A single backslash indicates that either a directory or a filename follows. In this case, "rfc" is a directory and "rfc1738.txt" is the file in that directory which is displayed when this URL is requested by the web browser 20.

The World Wide Web is built on top of the Internet. HTTP is the client/server protocol used most commonly on the World Wide Web. HTTP is used to set up communication between a client and a server and pass commands and files between the two systems.

HTTP provides a means for a web browser to access a web server and request documents created using the HyperText Markup Language (HTML). HTML web pages can include images, sound clips, text files and other types of objects. Some of the objects may not be part of the original HTML parent file (the base component of the web document) requested by the web browser 20. Instead, the HTML parent file contains external references to these inline objects, which are in the form of other data files on the server. When a user retrieves the HTML parent file on the web browser, the inline objects are also retrieved and inserted into the displayed of the document. Thus, an HTML document (or "page") actually consists of the HTML parent file along with any additional sound, graphics and multimedia inline objects specified with the parent file. For example, the inline objects may include advertising banners, sliders, bullet listings, graphic images, sound clips or other such items.

FIG. 2 is a timing diagram showing data transfer to and from the web browser 20. In FIG. 2, time progresses from left to right. The upward pointing arrows indicate outgoing messages from the web browser 20 intended for the web server 26. Downward arrows indicate incoming messages received at the web browser 20 from the web server 26. For simplicity of illustration, each incoming and outgoing message appears to be transferred instantaneously. In actual implementations, the transfer of each message typically requires a discernible amount of time.

An outgoing message 30 carries the initial URL request. In response, an incoming message 32 carries the first portion of a response to the request carried in the outgoing message 30. An incoming message 34 and an incoming message 36 correspond to a second and third portion of the response.

Assume that the incoming message 32 contains an external reference to an inline object. The web browser 20 examines the incoming information and in response sends an outgoing message 38 which carries a request for the inline object. For illustration purposes, we shall assume that the inline object is a sound clip.

Following the outgoing message 38, the web browser 20 receives an incoming message 40 containing additional information corresponding to the initial request carried in the outgoing message 30. After reception of the incoming messages corresponding to the initial request, the web browser 20 begins to receive the sound clip within an incoming message 42. In an incoming message 44, the web browser 20 continues to receive information concerning the sound clip.

Assume that the incoming message 42 contains an external reference to an inline object which is an ad banner. An outgoing message 46 carries a request for the ad banner. Following the outgoing message 46, the web browser 20 receives an incoming message 48 and an incoming message 50 containing additional information corresponding to the sound clip. Finally, in an incoming message 52, the web browser 20 receives the information concerning the ad banner.

Each time that the web browser 20 requests information from the web server 26, a delay is incurred. For example, notice that a time delay $\alpha T_{1A}$ elapses between the outgoing message 30 and the corresponding incoming message 32. The delay includes two primary components: (i) the round-trip delay associated with connection to the web server 26 and (ii) the response time of the web server 26. In the FIG. 2 example, the transfers of the inline objects are delayed by transfers of previously requested objects and the parent file and the time delays $\Delta T_{2A}$ and $\Delta T_{3A}$ are, therefore, longer than the delay $\Delta T_{1A}$.

As described in more detail below, because the HTTP protocol requires the web browser to examine the parent file and generate separate requests for the inline objects, the introduction of a link which introduces significant delay can greatly increase the amount of time required to fully retrieve and display a web page. For example, if the user's internet access channel includes a satellite link, the time required to retrieve a web page that includes a single inline object will be at least twice the round-trip delay of the satellite link. Further, the need to separately request inline objects produces unnecessary traffic over the communications link. The present invention seeks to overcome these problems without the need to modify the HTTP protocol.

SUMMARY OF THE INVENTION

The present invention addresses the above problems by providing a distributed system and method for prefetching inline objects of documents. In a preferred embodiment, the system is in the form of a distributed proxy server for use in an internet access system which includes a satellite link. The distributed proxy server includes an access point component which runs on the client (browser) side of the satellite link and communicates with web browsers, and includes a satellite gateway component which runs on the internet (web server) side of the satellite link and communicates with web servers. In operation, when a web server returns a parent file of a web page that has been requested by the user, the satellite gateway component parses the parent file to identify any references to inline objects, and prefetches these objects from the web server. The objects are thus requested without waiting for the browser to receive the parent file and generate requests for the inline objects.

The satellite gateway forwards the prefetched objects over the satellite link to the access-point component, which in-turn caches the inline objects until requested by the browser. If the access point component receives a request for an object which resides in the cache, the access point component returns the object without allowing the object request to be transmitted over the satellite link. The distributed proxy server thus reduces the delay associated with requests for inline objects, and reduces traffic over the satellite link.

Although the system in the preferred embodiment operates in conjunction with a satellite link, the underlying method and architecture can also be used to increase performance over other types of links, including non-wireless links. In addition, although the preferred embodiment operates in system which uses HTTP, the invention can also be used with other types of document retrieval protocols in which inline objects are requested separately from the base component.

In accordance with the invention, there is thus provided, in a client-server type document retrieval system in which inline objects of documents are requested and retrieved separately from base components of the documents, a distributed system for reducing a performance degradation caused by a communications link. The distributed system comprises a first component which runs on the client side of the communications link and communicates with clients, the first component being adapted to receive document requests from the clients and to forward the requests over the communications link for processing. The system also includes a second component which runs on the server side of the communications link and communicates with document servers, the second component being adapted to receive the document requests from the first component over the communications link and to forward the requests to the document servers, the requests causing the document servers to return base components of requested documents. In operation, the second component processes base components returned by the document servers by at least (i) parsing the base components to identify references to inline objects, (ii) prefetching the inline objects, and (iii) forwarding the base components and prefetched inline objects to the first component. The first component stores the prefetched inline objects received from the second component in a cache memory, and responds to object requests from the clients by forwarding the inline objects to the clients from the cache memory.

BRIEF DESCRIPTION OF THE DRAWINGS

The features, objectives, and advantages of the invention will become more apparent from the detailed description set forth below when taken in conjunction with the drawings wherein like parts are identified with like reference numeral throughout and wherein:

FIG. 1 is a block diagram showing an Internet connection.

FIG. 3 is a block diagram showing an Internet connection comprising a satellite link.

DETAILED DESCRIPTION OF A PREFERRED EMBODIMENT

Figure 2:
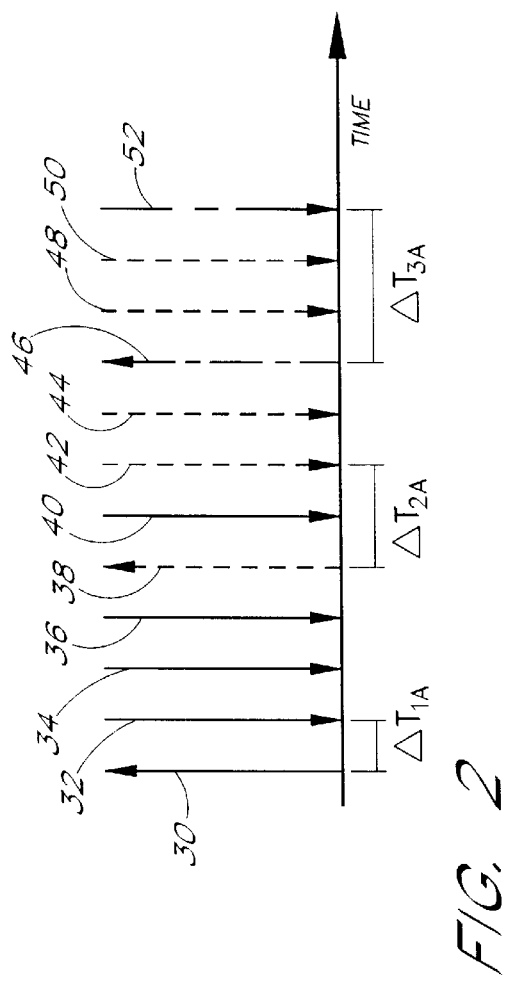
FIG. 2 is a timing diagram showing data transfer to and from a web browser.

The use of wireless communication systems for the transmission of digital data is becoming more and more pervasive. In a wireless system, the most precious resource in terms of cost and availability is typically the wireless link itself. Therefore, one major design goal in designing a communication system comprising a wireless link is to efficiently use the available capacity of the wireless link. In addition, typically, the delay associated with traversing the wireless link is significantly larger than the delay associated with the remainder of the network. Therefore, it is also desirable to reduce the delay associated with use of a wireless link.

Although stand-alone computers are very powerful tools, they become even more powerful when coupled together to form a network. As an increasing number of computers are coupled together, increasing demands are placed on the network which couples them together. If the computers are located close to one another, they may be interconnected by dedicated wireline connections. A computer which is located some significant distance away from a network may access the network by connection through a standard telephone line. However, telephone lines have a limited bandwidth which places a limit on the rate at which data may be transferred between the computer and the network.

Therefore, alternative means of accessing digital data networks have been developed. For example, satellite links may be used to transfer digital data within a data network. The use of a geosynchronous satellite link introduces a round-trip delay approximately equal to one-half of a second. The protocols currently in use on typical digital data networks were not developed with such large round-trip delays in mind. The use of a link which introduces significant delay can decrease the average data transfer rate below an acceptable level. The present invention reduces the inefficiencies caused by using a link which introduces significant delay to access a digital data system. The present invention also increases the efficient use of the digital data system link.

FIG. 3 is a block diagram illustrating an Internet connection comprising a satellite link. In FIG. 3, the web browser 20 is coupled to a satellite terminal 60. The satellite terminal 60 is coupled to an earth station 64 via a geosynchronous satellite 62. The earth station 64 is coupled to the series of routers 22A–22N of the Internet 24. The Internet 24 is coupled to the web server 26. Inclusion of the geosynchronous satellite link introduces a delay of about 270 milliseconds per transmission of a signal between the satellite terminal 60 and the earth station 64. Thus, each data transfer between the web browser 20 and the web server 26 exhibits a round-trip delay of at least one-half of a second.

Figure 4:
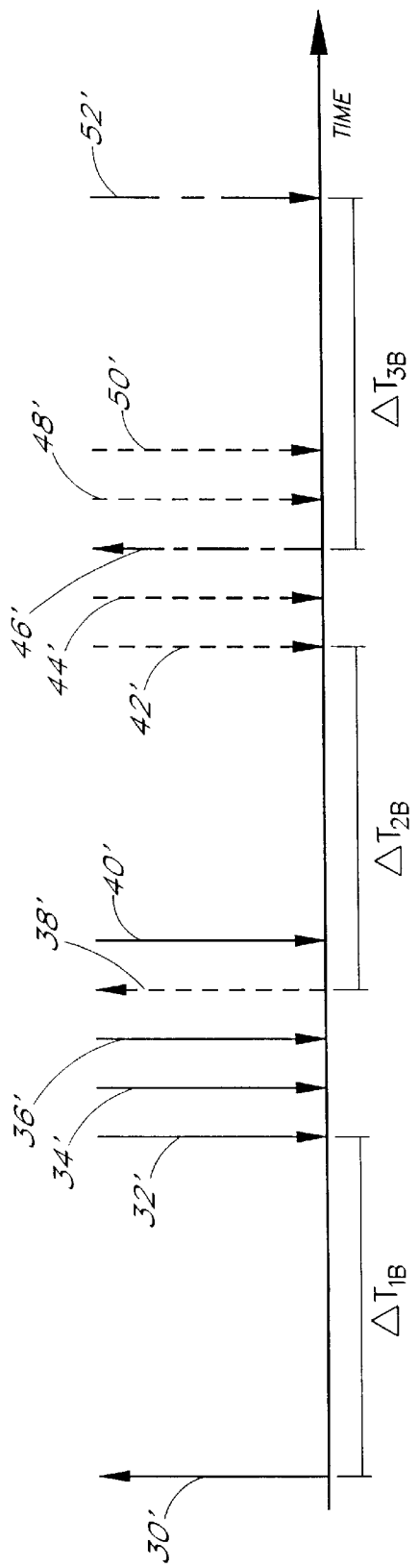
FIG. 4 is a timing diagram illustrating the transmission of the data shown in FIG. 2 after introduction of a satellite link into the system.

FIG. 4 is a timing diagram illustrating the transmission of the data shown in FIG. 2 over a system comprising a satellite link. Due to the nature of the nested requests for the inline objects, not only does the system incur an initial system delay equal to the round-trip delay, but it also incurs additional delay as the subsequent requests are made for the inline objects.

An incoming message 30' carries the initial URL request which is forwarded over the wireless link. Due to the round trip delay of the link, an incoming message 32' which carries the first portion of a response to the request carried in the outgoing message 30' is received after a delay of time delay $\Delta T_{1B}$. Assume that an incoming message 32' comprises an external reference to an inline object which is a sound clip. In response, the web browser 20 sends an outgoing message 38' which carries a request for the inline object. Due to the round trip delay of the link, an incoming message 42' which carries the first portion of a response to the request carried in the outgoing message 38' is received after a delay of time delay $\Delta T_{2B}$. Assume that a responsive incoming message 42' contains an external reference to an inline object which is an ad banner. An outgoing message 46' carries a request for the ad banner. Due to the round trip delay of the link, an incoming message 52' which carries the first portion of a response to the request carried in the outgoing message 46' is received after a delay of time delay $\Delta T_{3B}$.

Notice that the time delays $\Delta T_{1B}$, $\Delta T_{2B}$, and $\Delta T_{3B}$ are significantly longer in FIG. 4 than the time delays $\Delta T_{1A}$, $\Delta T_{2A}$, and $\Delta T_{3A}$ in FIG. 2. This difference is due chiefly to the round trip delay associated with the wireless link. Each time that a request is made, the first response is delayed by at least the round trip delay. Thus, the inclusion of a link which introduces a relatively long delay can significantly decrease the average data transfer rate as well as introduce a significant initial fixed delay.

Figure 5:
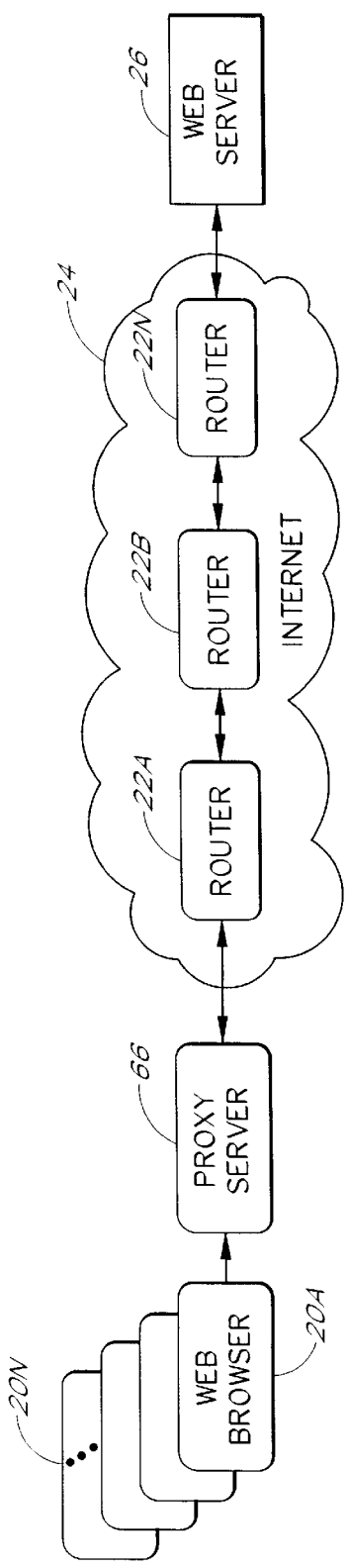
FIG. 5 is a block diagram showing an Internet connection comprising a proxy server.

FIG. 5 is a block diagram showing an Internet connection comprising a proxy server 66. The proxy server 66 is designed to interface a plurality of web browsers 20A–20N to the Internet 24. The proxy server 66 may be designed to protect the web browsers 20A–20N (and the network upon which they run) from hostile invasion by way of the Internet 24. For example, the proxy server 66 may be a one-way server that blocks other Internet users from accessing the internal network. Only packets that are received in response to an internal user's request are allowed back through the proxy server 66 from the Internet 24. Other data received at the proxy server 66 is not passed on to the web browsers 20A–20N.

Because the proxy server 66 provides a single point of connection for a set of users, it is fairly easy to perform functions such as virus scanning, content filtering and access control at the proxy server 66 rather than at the individual web browsers 20A –20N. Thus, a company may retain control over its internal network more easily using the proxy server 66 as a central control point for the network.

The proxy server 66 is designed to be transparent to the system users meaning that the web browsers 20A–20N are not aware of the existence of the proxy server 66. Web access occurs seamlessly through the proxy server 66. Although the web browsers 20A–20N may be unaware of the proxy server 66, the end result is that the web browsers 20A–20N receive a combination of information from the proxy server 66 and the Internet 24.

Often times, caching is used to increase the performance of the system as perceived by the web browser 20. The term "catching" refers to the process of storing copies of documents received by the proxy server 66 onto a local storage media (typically a disk but also main memory for short term caching.) Because the proxy server 66 provides a central location where each of the web browsers 20A–20N accesses the Internet 24, the proxy server 66 may cache frequently accessed documents so that they are quickly available to other web browsers 20 which request them. For example, in a financial services organization, many different browsers may access the Wall Street Journal home page during any given day. If the proxy server 66 has caching ability, the Wall Street Journal home page may be cached after the first request of each day. Subsequent requesters receive the Wall Street Journal home page from the local cache rather than over the Internet 24. In general, caching improves the performance of the system by reducing latency and saving network bandwidth.

One kind of caching, called "prefetching", involves caching documents that are likely to be requested by a client. One example of a document that is likely to be requested by a client is an inline object within a previously requested parent file. If the proxy server parses the originally parent file, the proxy server can determine that the document contains an external reference to an inline object and can begin retrieval of the inline object before the actual request arrives from the web browser.

In the case of prefetching inline objects, the request prediction is highly deterministic. In the rare case where the web browser software is not configured to load inline objects automatically, the prediction will fail. Also, if the user interrupts the retrieval before all inline objects are requested, some of the objects will not be requested by the web browser. However, in the general case, each of the inline objects referenced by the parent document is requested by the web browser.

If one attempts to integrate a prior art proxy server comprising a caching ability into an Internet connection comprising a wireless satellite link, system performance is not greatly improved. For example, referring again to FIG. 3, assume that a proxy server is inserted between the earth station 64 and the router 22A. When an initial request is generated by the web browser 20, it is forwarded from the satellite terminal 60 over the wireless link to the earth station 64. The earth station 64 forwards the request to the proxy server which in turns forwards it to the Internet 24. When the response from the Internet 24 is received, the proxy server forwards it to the earth station 64. The proxy server also parses the information in the response to the initial request to determine the presence of inline objects. The proxy server sends surrogate requests for the inline objects and stores the objects as they arrive. Meanwhile, the response to the initial request is forwarded over the wireless link to the web browser 20. When the web browser 20 receives the response, it forwards a request for the inline object back over the wireless link. When the proxy server receives the request, it responds with the cached prefetched information, thus, eliminating any extra delay associated with transmission over the Internet 24. The information corresponding to the inline object traverses the wireless link to the web browser 20 Thus, the round trip delay of the wireless link is not avoided. Because the round-trip delay over the wireless link is the most significant factor in determining the latency of the system in FIG. 3, system performance is not significantly improved by the inclusion of a proxy server on the gateway side of the satellite link.

Likewise, assume that a prior art proxy server is inserted between the satellite terminal 60 and the web browser 20. When an initial request is generated by the web browser 20, it is forwarded to the proxy server which forwards it to the satellite terminal 60. The satellite terminal 60 forwards it over the wireless link to the earth station 64. The earth station 64 forwards the request to the Internet 24. When the response from the Internet 24 is received, the earth station 64 forwards the response over the wireless link to the satellite terminal 60 and the proxy server. The proxy server forwards the response to the web browser 20. The proxy server also parses the information to determine the presence of inline objects. The proxy server prefetches the inline objects by sending a surrogate request for them over the wireless link. When the web browser 20 receives the initial response, it forwards a request for the inline object to the proxy server. When the proxy server receives the request from the web browser 20, it intercepts the request and does not forward it over the wireless link. The proxy server waits for the surrogate request and the corresponding response to traverse the wireless link and forwards the information to the web browser when available, thus, eliminating any extra delay associated with transmission of the initial response from the proxy server to the web browser 20 and transmission of the request from the web browser 20 to the proxy server. However, the round trip delay of the wireless link is not avoided. Because the round-trip delay over the wireless link is the most significant factor in determining the latency of the system in FIG. 3, system performance is not significantly improved by the inclusion of a proxy server on the satellite terminal side of the satellite link.

Figure 6:
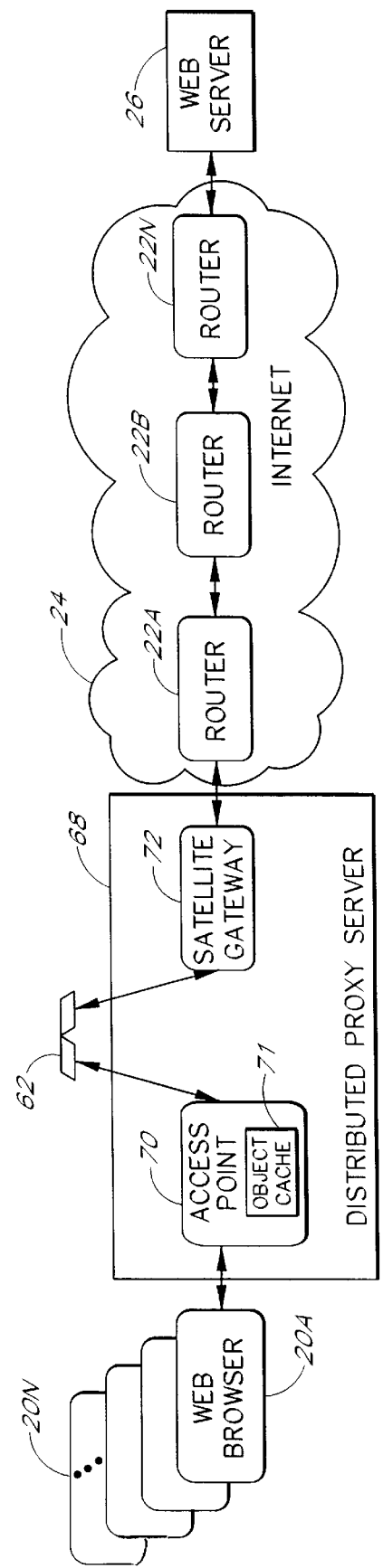
FIG. 6 is a block diagram showing a digital data network comprising a distributed proxy server according to the invention.

FIG. 6 is a block diagram showing an Internet access system comprising a distributed proxy server according to the invention. In FIG. 6, the web browsers 20A–20N are coupled to the Internet 24 by means of a distributed proxy server 68. The distributed proxy server 68 comprises two components: an access point component 70 ("access point") and a satellite gateway component 72 ("satellite gateway"). The access point 70 and the satellite gateway 72 may be implemented on one or more workstations or personal computers which run corresponding software components. Some or all of the functions of the access point 70 and satellite gateway 72 can alternatively be implemented using application-specific hardware. The access point 70 and the satellite gateway 72 are connected via a wireless link over the satellite 62. The web browsers 20A–20N are preferably connected to the access point 70 by a local area network (not shown). As depicted in FIG. 6, the access point 70 implements an object cache 71 for temporarily storing objects that have been prefetched by the satellite gateway 72.

The distributed proxy server 68 facilitates efficient data transfer by reducing the effect of the round-trip delay associated with transversal of the satellite link. The access point 70 and the satellite gateway 72 may also provide services typically performed by prior art proxy servers. In the preferred embodiment, the use of the distributed proxy server 68 is transparent to the entities coupled to the Internet 24, such as the web server 26 and the web browser 20.

Figure 7:
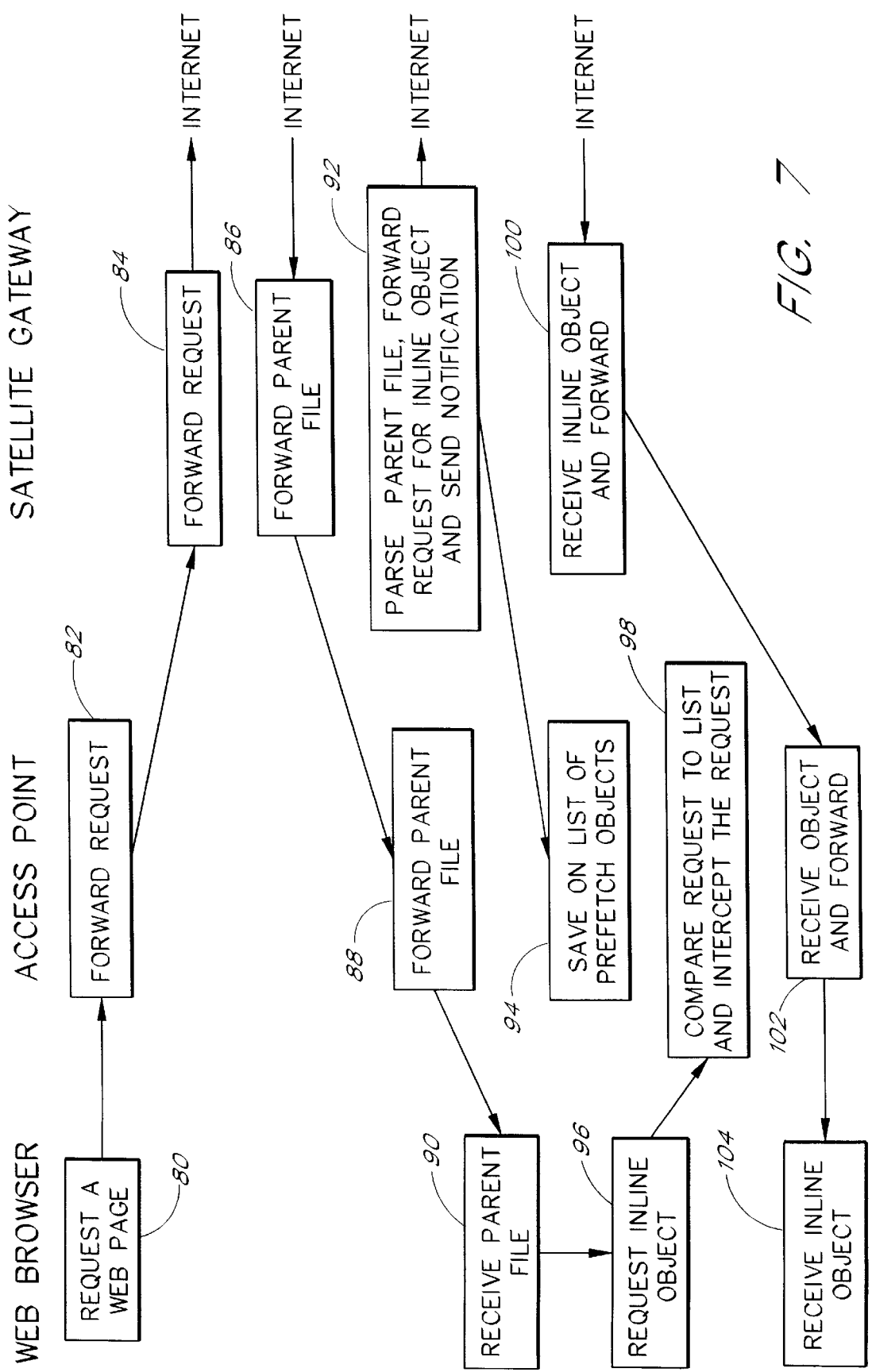
FIG. 7 is a data flow diagram showing one embodiment of data transfer according to the invention.

FIG. 7 is a data flow diagram showing one embodiment of data transfer according to the invention in which the requested web page is comprised of a parent file component which references an inline object. The inline object may, for example, be text or digital data file, an image file (such as a GIF image file), a sound clip, a program applet or module, or any other type of items that can be incorporated into a web page. In block 80, the web browser 20 requests the web page. The access point 70 receives the request and forwards it to the satellite gateway 72 over the wireless link in block 82. After some delay, the request is received at the satellite gateway 72. In block 84, the satellite gateway 72 forwards the request to the Internet 24. The satellite gateway 72 may comprise a network communication module for executing this function.

The web server 26 receives the request and responds with the parent file. The satellite gateway 72 receives the parent file from the Internet 24 and forwards it to the access point 70 in block 86. After the file traverses the wireless link, the access point 70 forwards the parent file to the web browser 20 in block 88. In block 90, the web browser receives the parent file.

Prior to, during or after transmission of the transfer of block 86, the satellite agateway parses the parent file, extracts an external reference to an inline object and forwards a surrogate request for the inline object over the Internet 24 in block 92. For example, the satellite gateway 72 may comprise a parsing module and a surrogate request generation module to carry out these functions. Also in block 92, the satellite gateway 72 sends a message to the access point 70 identifying the inline object which it is prefetching. For example the satellite gateway 72 may comprise a message module which creates and sends messages to the access point 70. In block 94, the access point 70 receives the prefetch object listing and stores it for later reference, such as within a caching module.

In block 96, the web browser 20 forwards a request for the inline object. In block 98, the access point 70 compares the request to the list of prefetch objects. If the request corresponds to an entry on the list of prefetch objects, the request is intercepted and is not forwarded over the wireless link. If the requested object does not correspond to an entry on the list and is not available in the cache, the access point 70 forwards the request over the wireless link. This function may be carried out by a message analysis and comparison module.

In the FIG. 7 example, because the inline object appears on the list of objects which have been or are currently being fetched, the access point 70 intercepts the request and does not forward the request over the satellite link. Meanwhile, in block 100, the inline object is received at the satellite gateway 72 and automatically forwarded to the access point 70. Notice that the satellite gateway 72 has not received a request for the inline object and is sending a response to the initial request to the access point 70 containing information which the access point 70 has not requested from the satellite gateway 72. Such a response is termed a "chubby response." For example, the satellite gateway 72 may comprise a chubby response creation module which performs these functions. In block 102, the access point 70 receives the object and forwards it to the web browser 20. In block 104, the web browser 20 receives the inline object. In this way, the delay associated with awaiting the transmission of the request over the satellite link is avoided and the inline objects are transferred shortly after the parent file. In addition, the bandwidth normally occupied by the wireless requests for inline objects is freed for other uses.

Figure 8:
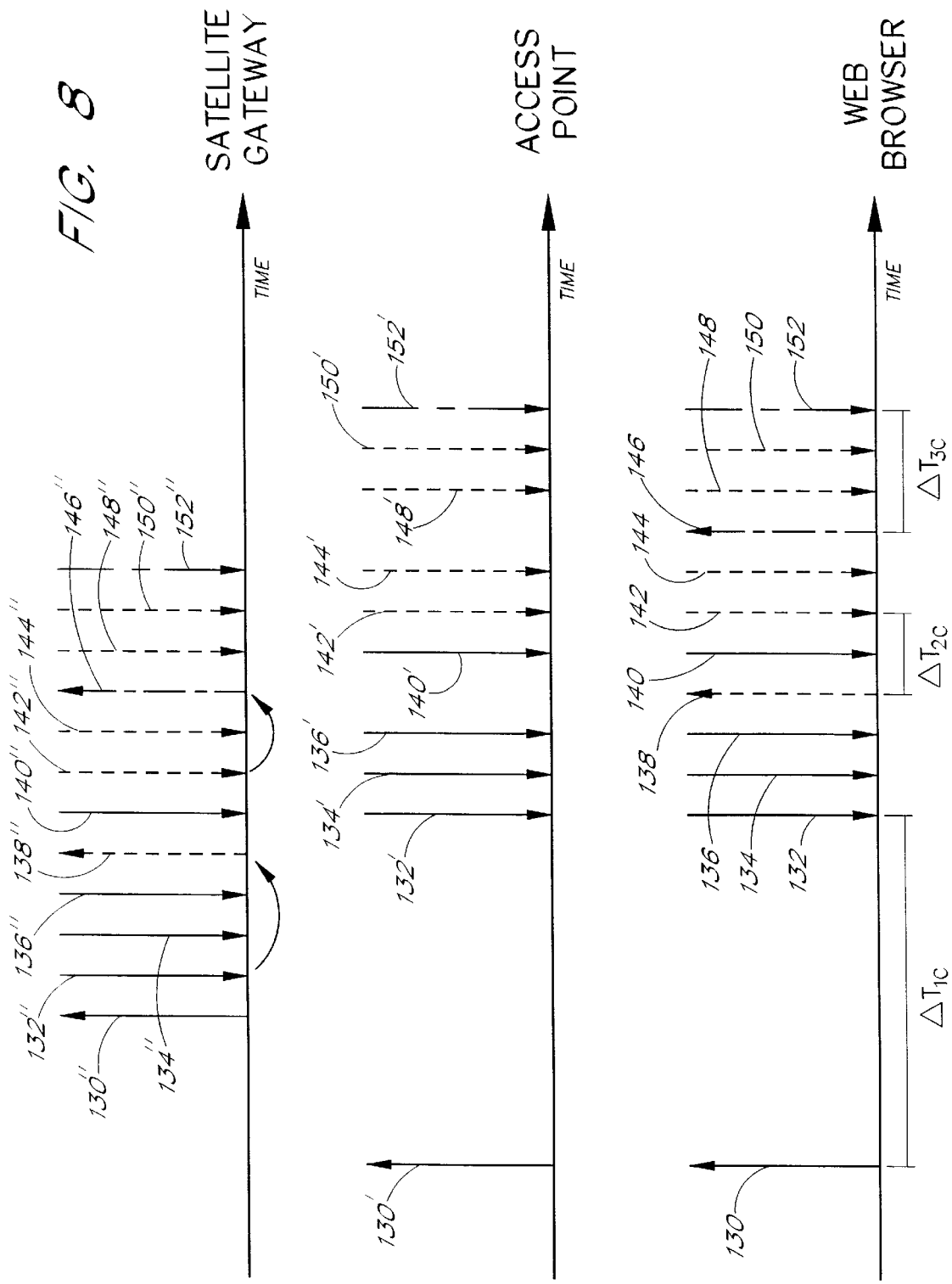
FIG. 8 is a timing diagram illustrating the transmission of the data shown in FIGS. 2 and 4 as transferred over a distributed proxy server according to the invention.

The efficiencies gained by using data flow as described in FIG. 7 can be readily seen with reference to the timing diagram of FIG. 8. FIG. 8 is a timing diagram illustrating the transmission of the data shown in FIGS. 2 and 4 as transferred over a distributed proxy server according to the invention. In order to illustrate the data flow more clearly, in addition to the data flow as perceived at the web browser 20, FIG. 8 also shows the data flow as perceived by the access point 70 and by the satellite gateway 72.

An outgoing message 130 from the web browser carries the initial URL request. The access point 70 forwards a corresponding outgoing message 130' over the wireless link. The satellite gateway 72 sends a corresponding outgoing message 130' over the Internet 24. Notice the delay between the outgoing message 130' and the outgoing message 130" due to the introduction of the wireless link. An incoming message 132" carries the first portion of a response to the request of the outgoing message 130". An incoming message 134" and an incoming message 136" carry a second and third portion of the response. The incoming message 132" carries an external reference to an inline object which we shall assume is a sound clip. The satellite gateway 72 parses the incoming message 132" and recognizes the external reference. In an outgoing message 138", the satellite gateway 72 sends a surrogate request over the Internet 24 for the sound clip, in this way prefetching the sound clip.

The incoming messages 132", 134" and 136" are forwarded to the access point 70 where they are received as the incoming messages 132', 134' and 136', respectively, once again incurring a delay due to the wireless link. The access point 70 forwards them to the web browser 20 where they are received as the incoming messages 132, 134 and 136, respectively. In response to the incoming message 132, the web browser 20 sends an outgoing message 138 requesting the sound clip. Notice that at the time the outgoing message 138 is sent from the web browser 20, the outgoing message 138" has already been forwarded by the satellite gateway 72 to the Internet 24. Therefore, the access point 70 intercepts the request and does not forward it to the gateway 72, thus, reducing the amount of data sent over the satellite link. Therefore, in FIG. 8, no corresponding outgoing message 138' is forwarded from the access point 70 to the satellite gateway 72. At the satellite gateway 72, an incoming message 140" is received as the fourth and last response to the original request and is forwarded to the access point 70 where it is received as an incoming message 140'.

An incoming message 142" and an incoming message 144" are received in response to the request for the sound clip. The incoming message 142" carries an external reference to an inline object which we shall assume is an ad banner. Once again, the satellite gateway 72 parses the incoming message 142" and detects external reference to the ad banner. An outgoing message 146" is sent by the satellite gateway 72 carrying a surrogate request for the ad banner.

Meanwhile, the incoming messages 142" and 144" are automatically forwarded to the access point 70 without awaiting a corresponding request from the access point 70 for the inline object. In this way, the inline objects are both prefetched and pre-transferred over the wireless link, thus, significantly reducing the latency perceived by the web browser 20. The incoming messages 142" and 144" are received as the incoming messages 142" and 144', respectfully, at the access point 70. The incoming messages 142' and 144' are forwarded to the web browser 20 after they are requested by the web browser 20 in the outgoing message 138. They are received by the web browser 20 as the incoming messages 142 and 144, respectfully. In response to receipt of the incoming message 142 containing the external reference to the ad banner, the web browser 20 sends an outgoing message 146 requesting the ad banner. Once again, the access point 70 intercepts the request and no corresponding outgoing message 146' is forwarded from the access point 70 to the satellite gateway 72.

Meanwhile, the satellite gateway 72 continues to receive an incoming message 148" and an incoming message 150" in response to the request for the sound clip and forwards them to the access point 70. The access point 70 receives them as the incoming messages 148' and 150' subject to the delay introduced by the wireless link. The access point 70 forwards these transmissions to the web browser 20 where they are received as the incoming messages 148 and 150. In response to the request in the outgoing message 146" for the ad banner, an incoming message 152" is received at the satellite gateway 72 and is automatically forwarded to the access point 70 without awaiting a corresponding request. The access point 70 receives the ad banner information as an incoming message 152' and forwards it to the web browser 20 in response to a request carried in the outgoing message 146 where it is received as an incoming message 152.

Examination of FIG. 8 in comparison with the prior art of FIG. 4 reveals the efficiencies introduced by the use of the proxy server 68. Notice that there is a substantial delay $\Delta T_{1C}$ between the incoming message 130 and the incoming message 132 in FIG. 8 just as there is a substantial delay $\Delta T_{1A}$ between the outgoing message 30' and the incoming message 32' in FIG. 4. A large portion of this delay is due to the round-trip delay associated with using the wireless link. However, note that the substantial delay $\Delta T_{2B}$ between the outgoing message 3 8' and the incoming message 42' of FIG. 4 is not exhibited by the delay $\Delta T_{2C}$ between the outgoing message 138 and the incoming message 142 in FIG. 8 due to the fact that the information was prefetched and also pre-transferred in a chubby response. In addition, the substantial delay $\Delta T_{3B}$ between the outgoing message 46' and the incoming message 52' of FIG. 4 is not exhibited by the delay $\Delta T_{3C}$ between the outgoing message 146 and the incoming message 152 of FIG. 8 for the same reason. The delays $\Delta T_{2C}$ and $\Delta T_{3C}$ in FIG. 8 are comparable to the delays $\Delta T_{2A}$ and $\Delta T_{3A}$ in FIG. 2. In this way, the average data rate is increased by use of the invention and the latency associated with system use is decreased.

In FIG. 7, the access point 70 has been notified that the inline object has been prefetched in block 94 before the request for the inline object is made by the web browser 20 in block 96. However, in some cases, the web browser 20 may request the inline object before the prefetch notification is received. In such a case, the access point 70 may store the request for some preprogrammed period of time such as three seconds. If, within the period of time, the object does not appear on a list of prefetch objects and is not received at the access point 70, the access point 70 may forward the request to the satellite gateway 72. By delaying transmission of the request, the number of requests transmitted over the wireless link is reduced.

In alternative embodiments, these problems of correlating requests from the web browser 20 with the objects which are in the process of being prefetched and forwarded in a chubby response can be avoided. In one embodiment, the access point 70 parses the incoming files to determine the presence of inline objects in a similar manner as the satellite gateway 72. The access point 70 assumes that the satellite gateway 72 will prefetch all of these inline objects. For example, when the parent file is received in block 88 at the access point 70, the access point 70 may parse the parent file to extract any external references to inline objects. The access point 70 may assume that the gateway 72 is in the process of prefetching the inline objects and may create its own list of prefetch objects comprising all of the inline objects. Because the access point 70 always receives the parent file before the web browser 20, the access point 70 may establish its list of prefetch objects before any requests are received from the web browser 20. If a request is received which appears on the list of prefetch objects but the object itself is not received at the access point 70 within a given amount of time, the access point 70 may forward the request to the satellite gateway 72. Notice that in this embodiment, the transfer of notification data from the satellite gateway 72 to the access point 70 noted in block 92 of FIG. 7 does not occur, thus, decreasing the amount of data transferred over the satellite link. Because the correlation problem is avoided, the access point 70 need not delay asking for objects should it receive a request for an object which is neither available nor on the list, thus, decreasing the overall latency associated with system use.

In yet another alternative embodiment, the correlation problem is addressed without increasing the functionality of the access point 70 to include parsing. Referring again to FIG. 7, when the satellite gateway 72 receives parent file from the Internet 24 in block 86, it may first parse the parent file to determine whether there are any external references to inline objects before forwarding the parent file information to the access point 70. If there are no external references, the satellite gateway 72 may immediately forward the parent file to the access point 70. If one or more external references are made, the satellite gateway 72 may request and receive data corresponding to one or more of the inline objects before beginning transfer of the parent file to the access point 70. In this way, the inline objects consistently follow directly after the parent file and, thus, are available at the access point 70 when requested by the web browser 20. In one embodiment, the satellite gateway 72 receives all the inline objects before beginning transmission of the parent file to the access point 70. In another embodiment, the satellite gateway 72 receives one or more of the inline objects before beginning transmission of the parent file to the access point 70. In yet another embodiment, the satellite gateway 72 receives a predetermined amount of data which may correspond to a portion of one or more inline objects before beginning transmission of the parent file to the access point 70. In addition to avoiding the correlation problem, this method does not require that notification messages are sent from the satellite gateway 72 to the access point 70, thereby, reducing the traffic flow over the wireless link. Because the correlation problem is avoided, the access point 70 need not delay forwarding requests for objects should it receive a request for an object which is not available, thus, decreasing the overall latency associated with system use.

The rapid availability of the inline objects at the web browser 20 after the initial display of the parent file in each of these embodiments has the advantage of reducing the overall time required for the web page to be fully downloaded and displayed, and thus increases performance from the perspective of the user.

In yet another embodiment, upon receipt of a parent file at the satellite gateway 72, the satellite gateway 72 parses the parent file and begins to request inline objects. As the inline objects are received, the satellite gateway 72 forwards the inline objects to the access point 70. After the satellite gateway 72 has requested, received and transferred all or a portion of the inline objects, including the nested inline objects within other inline objects, the satellite gateway 72 begins to forward the parent file to the access point 70. The transfer of the prefetch inline objects before the parent file is transferred assures that all inline objects are available at the access point 70 before they are requested by the web browser 20. In addition, this embodiment does not require the use of notification messages nor the inclusion of additional functionality at the access point 70 and allows the access point 70 to forward requests for unknown objects without insertion of intentional delay.

As noted above, data is typically transferred over current standard digital data networks typically according to the HTTP protocol. HTTP is a request/response protocol. The client sends a request to the server and the server answers with a response. This simple protocol avoids the use of multi-step handshake routines in the beginning of each data transmission. However, there is no provision in the HTTP protocol for a client to receive an unrequested data transfer in a chubby response message.

In the preferred embodiment, the link which connects the satellite gateway 72 to the access point 70 comprises a means of transferring unrequested data using a chubby response message. To provide such functionality, the link which connects the satellite gateway 72 to the access point 70 is outside of the pure HTTP protocol. It is important that the distributed proxy server 68 be transparent to the web browser 20 and web server 26. For this reason, it is important that the distributed proxy server 68 support well-known data transfer protocols such as HTTP, at least as perceived by external entities. However, because the satellite gateway 72 and the access point 70 are peer units controlled by a common access provider, it is not necessary that the link which connects the access point 70 and the satellite gateway 72 operate according to industry standard protocols. Therefore, one skilled in the art may develop a protocol according to well-known techniques which allows unrequested data transfer to occur between the satellite gateway 72 and the access point 70 such as through the use of a chubby response.

As depicted by FIG. 6, the access point 70 may concurrently service a plurality of web browsers 20A–20N, in which case the access point software will typically run on a separate computer which communicates with the web browser computers over a local area network. Alternatively, the access point program may run on the same computer (PC, etc.) as the web browser software. In addition, although the satellite gateway 72 is depicted as communicating with a single access point 70, the gateway may serve a plurality of geographically-distributed access points.

In one embodiment, the access point 70 is consolidated within a single housing. The housing is coupled to an antenna which is positioned external to a building in which the housing is placed. A local area network couples a plurality of web browsers 20 to the housing. In another embodiment, the access point 70 program runs on the same machine as the web browser 20, and this machine is coupled to a roof-top satellite dish and transceiver. In yet another embodiment, the functionality and modules of the access point 70 are distributed across a plurality of computing units.

In general, the functions and modules of the access point may be distributed across computing entities on one side of the subject link and the gateway functions and modules may be distributed across computing entities on the other side of the link. Further, it is not necessary that either the access point or the gateway be directly coupled to the subject link, as the communications channel between the access point 70 and the gateway may include other computing entities and/or communications links.

The same techniques which are described above can be applied to other external files even if the probability of a subsequent request for those files is less than the probability of requests for the inline objects. For example, many web pages contain hypertext links to other web pages which the user may choose to access. A home page for a manufacturing company may have a hypertext link to an employment page, a product information page, a company information page and a press release page. A user who accesses the home page is reasonably likely to access one of the pages referenced by the hypertext links. After all the inline objects are retrieved by the satellite gateway 72, the gateway may begin predictive prefetching of the linked web pages and transferring them to the access point 70 in a similar manner as the inline objects. The amount of data may be limited so as to prevent an endless cascade of data. If the user requests one of the predictively prefetched links, he receives the information directly from the access point 70, thereby avoiding the round trip delay associated with using the wireless link.

Although the example above was described in terms of a web browser accessing web server over the Internet, the principles of the invention may be applied in many situations where a data terminal requests a data file which contains a reference to an external data file over a data network having a link which introduces substantial delay. In such a case, the requesting unit may be any sort of digital equipment which can generate a file request and the responding unit may be any type of digital equipment which can transfer a file. For example, the Internet 24 shown in the figures may be a public or private local area network or wide area network other than the Internet.

A myriad of alternate embodiments will be readily apparent to one skilled in the art upon examination of the disclosure. For example, although the preferred embodiment was shown with reference to a satellite link, the teachings of the invention may be directly applied to any link which introduces significant delay whether a wire line or wireless link.

In addition, as noted above, the use of the invention reduces amount of data which flows from the access point to the gateway. This reduction can be important even in those systems where the delay of the path between the access point and the gateway is not substantial. For example, cable modems are highly asymmetrical links. The down stream link from the Internet to the user has a fairly high bandwidth while the upstream link from the user to the Internet has a very limited bandwidth. Therefore, even if delay is not an issue, it may be advantageous to incorporate a distributed proxy server in order to reduce the upstream traffic flow.

The invention may be embodied in other specific forms without departing from its spirit or essential characteristics. The described embodiment is to be considered in all respects only as illustrative and not as restrictive and the scope of the invention is, therefore, indicated by the appended claims rather than the foregoing description. All changes which come within the meaning and range of equivalency of the claims are to be embraced within their scope. In the claims that follow, reference characters used to reference process steps are provided for convenience of description only, and not to imply a particular order for performing the steps.

What is claimed is:

1. In an internet access system that includes a communications link, the communications link having a client side and having a server side which is remote from the client side, a method of processing a client request for a document that includes an inline object, the client request generated by a client and directed to a document server, the document comprising a base component which includes a reference to the inline object, the method comprising:
   on the client side of the communications link:
      (a) receiving the client request and forwarding the request over the communications link to the server side; on the server side of the communications link:
      (b) receiving the client request, and forwarding the request to the document server over an internet;
      (c) receiving the base component from the document server, parsing the base component to identify the reference to the object, and forwarding the base component over the communications link to the client side for delivery to the client; and
      (d) prefetching the inline object from the document server using the reference identified in step (c), and, without waiting for the client to request the object, forwarding the object over the communications link to the client side for delivery to client;
   wherein said prefetching is initiated on the server side of the communications link, transparently to the client.

2. The method of claim 1, further comprising the steps of, on the client side of the communications link:
   receiving and caching the object forwarded in step (d); and
   in response to a client request for the object, forwarding the object to the client.

3. The method of claim 2, further comprising the step of intercepting said client request for the object on the client side of the communications link to prevent the client request for the object from being transmitted over the communications link.

4. The method of claim 1, wherein the communications link is a satellite link, and the method avoids a delay normally associated with sending a client request for the object over the satellite link.

5. The method of claim 4, further comprising sending a prefetch notification message from the server side to the client side to notify an entity on the client side that the object is being prefetched.

6. The method of claim 1, further comprising repeating step (d) for each of a plurality of additional inline objects of the document.

7. The method of claim 1, wherein step (a) comprises communicating with a web browser program using a standard internet protocol.

8. The method of claim 1, wherein the document includes a hypertextual link to a second document, and the method further comprises prefetching the second document on the server side and forwarding the second document to the client side.

9. In a client-server type document retrieval system in which inline objects of documents are requested and retrieved separately from base components of the documents, a distributed system for reducing a performance degradation caused by a communications link, the distributed system comprising:
   a first component which runs on a client side of the communications link and communicates with clients, the first component adapted to receive document requests from the clients and to forward the requests over the communications link for processing; and a second component which runs remotely from the first component on a server side of the communications link and communicates with document servers, the second component adapted to receive the document requests from the first component over the communications link and to forward the requests to the document servers, the requests causing the document servers to return base components of requested documents;

wherein the second component processes base components returned by the document servers by at least (i) parsing the base components to identify references to inline objects, (ii) prefetching the inline objects, and (iii) forwarding the prefetched inline objects to the first component without waiting for client requests for the inline objects;

and wherein the first component stores prefetched inline objects received from the second component in a cache memory, and responds to object requests from the clients by forwarding the inline objects to the clients from the cache memory;

wherein the inline objects are prefetched transparently to the clients.

10. The distributed system of claim 9, wherein the first component intercepts a client request for an object when the object resides within the cache memory, the first component thereby reducing traffic over the communications link.

11. The distributed system of claim 9, wherein the second component sends a prefetch notification message over the communications link to notify the first component that an inline object is being prefetched, and the first component responds to the prefetch notification message by inhibiting transmission of a client request for the object over the communications link.

12. The distributed system of claim 9, wherein the communications link is a satellite link, and the first and second components reduce a delay normally associated with requests for inline objects over the satellite link.

13. The distributed system of claim 12, wherein the first component runs at a client access point to the satellite link, and second component is part of a satellite-to-internet gateway system.

14. The distributed system of claim 9, wherein the communications link is a cable-based link for providing internet access by cable modem.

15. The distributed system of claim 9, wherein the document retrieval system is a hypertextual system, and the second component is further configured to prefetch a document that is hypertextually referenced within a requested document.

16. The system of claim 9, wherein first component and the second component implement standard World Wide Web protocols for communicating with the clients and document servers, respectively.

17. In an internet access system which includes a satellite link, the satellite link having a browser side and having an internet side which is remote from the browser side, a method of processing a document request for a web document that includes an inline object, the document request generated by a web browser and directed to a web server, the document comprising a base file component which includes a reference to the inline object, the method comprising:

on the browser side of the satellite link:
(a) receiving the document request and forwarding the request over the satellite link to the internet side;
(b) receiving the inline object over the satellite link from the web server, and storing the inline object in a memory;
(c) receiving a request for the object from the browser, and in response thereto, forwarding the object to the browser from the memory;

on the internet side of the satellite link:
(d) receiving the document request, and forwarding the document request to the web server over an internet;
(e) receiving the base component from the web server, parsing the base component to identify the reference to the object, and forwarding the base component over the satellite link to the browser side for delivery to the browser; and
(f) prefetching the inline object from the web server using the reference identified in step (e), and, without waiting for a request for the inline object from the browser, forwarding the object over the satellite link to the browser side for delivery to browser.

18. The method of claim 17, wherein steps (a), (b) and (c) are performed by program which runs on the same computer as the browser.

19. The method of claim 17, wherein steps (a), (b) and (c) are performed by a program which communicates with the browser and a plurality of additional browsers over a local area network.

20. The method of claim 17, further comprising sending a prefetch notification message over the satellite link from the internet side to the browser side to notify an entity on the browser side that the object is being prefetched.

21. A method of data transfer over a communication path comprising a link which passes digital data, comprising the steps of:

receiving an initial request for a data file from a requesting unit at an access point;

forwarding said initial request over said link from said access point to a gateway which is remote from said access point;

forwarding said initial request over a data network from said gateway;

receiving said data file over said data network at said gateway;

forwarding said data file from said gateway to said access point;

forwarding said data file from said access point to said requesting unit;

at said gateway, parsing said data file to determine inclusion of a reference to an external data file, and in response to detection of the reference, generating and transmitting over said data network a surrogate request for said external data file;

receiving said external data file over said data network at said gateway in fulfillment of said surrogate request;

forwarding said external data file from said gateway to said access point;

receiving a request for said external data file from said requesting unit at said access point; and in response to said request from the requesting unit for said external data file, forwarding said external data file from said access point to said requesting unit.

22. The method of claim 21, wherein the step of forwarding said data file from said gateway to said access point is performed after said step of receiving said external data file from said data network at said gateway.

23. The method of claim 21, wherein the step of forwarding said data file from said gateway to said access point is performed after said step forwarding said external data file from said gateway to said access point.

24. The method of claim 21, further comprising the step of forwarding a notification message identifying said external data file from said gateway to said access point before transmission of said external data file to said access point.

25. The method of claim 24, further comprising the step of intercepting said request at said access point if a prefetch list contains a reference to said external file.

26. The method of claim 21, further comprising the step of parsing said data file at said access point to determine a list of prefetched files.

27. The method of claim 1, wherein said prefetching is further initiated transparently to the document server.

28. The system of claim 9, wherein the inline objects are further prefetched transparently to the document servers.

29. The method of claim 17, wherein (c) further comprises blocking the request for the object from being transmitted over the satellite link.

30. The method of claim 21, wherein said link comprises a satellite link.

31. The method of claim 30, wherein said satellite link uses a satellite in geosynchronous orbit.

32. The method of claim 21, wherein said external data file is an inline object.

33. A system for providing Internet access via satellite, comprising:

an access point coupled to a plurality of web browsers; and a satellite gateway coupled to the access point by a wireless satellite link, wherein the satellite gateway is remote from the web browsers and the access point, and is connected to the Internet such that the access point, the wireless satellite link, and the satellite gateway collectively provide a communications path between the web browsers and the Internet;

wherein the satellite gateway parses parent files of web pages requested by the web browsers to identify references to inline objects of such web pages, and in response to detection of a reference to an inline object, prefetches the inline object and forwards the inline object over the satellite link to the access point for delivery to a web browser.

34. The system of claim 33, wherein the access point caches inline objects prefetched by the satellite gateway.

35. The system of claim 34, wherein the access point blocks requests from the web browsers for inline objects to prevent such requests from unnecessarily being transmitted over the satellite link.

36. The system of claim 33, wherein the satellite link is a geosynchronous satellite link.

37. The system of claim 33, wherein the access point and the satellite gateway operate transparently to the web browsers, such that non-prefetch-aware web browsers may be used.

38. The system of claim 33, wherein the satellite gateway further prefetches at least one additional type of object referenced within a parent file.

39. The system of claim 33, wherein the satellite gateway sends prefetch notification messages to the access point identifying objects that are being prefetched.

40. In an Internet access system comprising a wireless satellite link having a client side and a server side which is remote from the client side, a method of reducing a delay associated with the retrieval of a web page which contains an object, the method comprising, on the server side of the satellite link:

retrieving a parent file of the web page from a remote web server in response to a request from a browser on the client side of the satellite link;

parsing the parent file of the web page to identify a reference to the object; and in response to detection of the reference, prefetching the object from a web server, and forwarding the object over the satellite link to the client side for delivery to the browser;

whereby a need for the browser to retrieve the object over the satellite link following receipt of the parent file is avoided.

41. The method of claim 40, further comprising, on the client side of the satellite link, storing the object in a cache, and responding to a request from the browser for the object by returning the object from the cache.

42. The method of claim 41, further comprising preventing said request for the object from being transmitted over the satellite link.

43. The method of claim 40, wherein the satellite link is a geosynchronous satellite link.

44. The method of claim 40, wherein the method is performed transparently to the browser.

45. The method of claim 40, further comprising sending a prefetch notification over the satellite link to the client side indicating that the object is being prefetched.

46. In an Internet access system comprising a satellite link having a client side and a server side, a method of retrieving a web page which contains an object, the method comprising, on the client side of the satellite link:

transmitting a browser request for a parent file of the web page over the satellite link to the server side;

receiving the parent file over the satellite link, and forwarding the parent file to a browser;

receiving over the satellite link the object as prefetched on the server side of the satellite link; and responding to a request for the object from the browser by (a) returning the object to the browser from the memory, and (b) preventing the request for the object from being transmitted over the satellite link.

47. The method of claim 46, further comprising, on the client side of the satellite link, receiving a prefetch notification message indicating that the object is being prefetched.

48. The method of claim 46, wherein the method is performed transparently to the browser.

49. The method of claim 48, wherein the method is further performed transparently to a web server from which the web page is retrieved.

50. The method of claim 46, wherein the satellite link comprises a satellite in geosynchronous orbit.

* * * * *